J. W. Ells,
Making Axes,
N°. 68,423.   Patented Sep. 3, 1867.
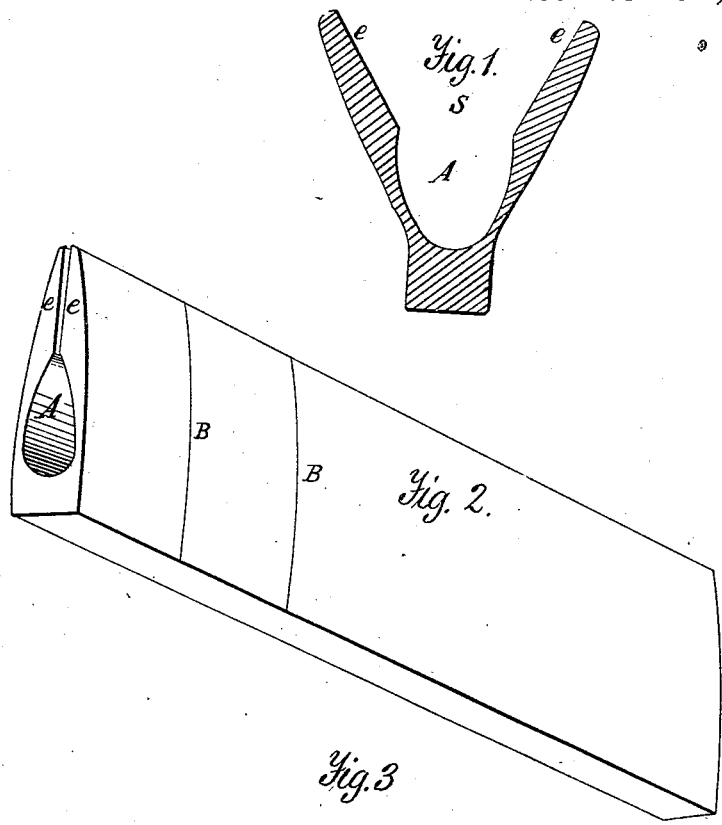
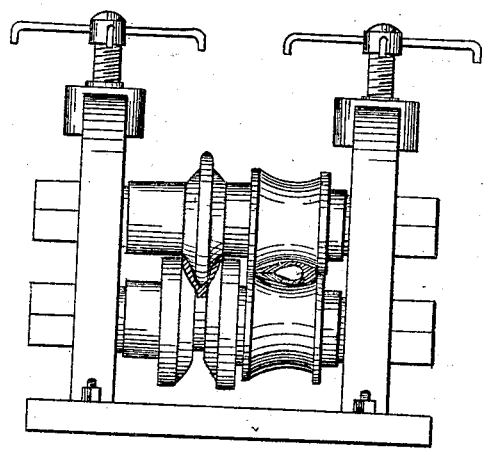
Witnesses.
John M<sup>c</sup> Kenna
J B Whaley
Inventor.
Josiah W. Ells.

United States Patent Office.

JOSIAH W. ELLS, OF PITTSBURG, PENNSYLVANIA, ASSIGNOR TO HIMSELF AND ISAIAH C. BREED, OF THE SAME PLACE.

*Letters Patent No. 68,423, dated September 3, 1867.*

---

IMPROVED METHOD OF MAKING AXE-BLANKS.

---

The Schedule referred to in these Letters Patent and making part of the same.

---

TO ALL WHOM IT MAY CONCERN:

Be it known that I, JOSIAH W. ELLS, of the city of Pittsburg, in the county of Allegheny, and State of Pennsylvania, have invented a new and improved Method of Making Axe-Blanks; and I hereby declare that the following is a full, clear, and exact description thereof, reference being had to the accompanying drawings, forming part of this specification, and to the letters of reference marked thereon.

The nature of my invention consists in forming axe-blanks by rolling them in continuous bars of such a shape that a cross-section of a bar will constitute an axe-blank having a complete poll and properly formed eye.

To enable others to understand and make axe-blanks in accordance with my plan, I will proceed to describe the operation by reference to the annexed drawings.

I take a bar or bloom of iron and bring it to a welding heat, and while in that condition I pass it between properly constructed rolls, until, by successive steps or stages, or repeated passages between the rolls in grooves of requisite shape and of gradually reducing size, it is brought to the form indicated by fig. 1, which represents a cross-section of a bar of iron, having a deep groove, S, extending longitudinally along its centre, the upper half of said groove having straight inclined sides $e$ $e$, while the lower half A is slightly curved, and terminating in a circular bottom. This bar, so formed, is then turned on its side, and passed between the rolls in that position, as seen at fig. 3, which closes the upper half of the groove S, bringing the straight parts $e$ $e$ together, by bending the thin, curved portion of the groove A around its axis, forming by that operation a perfect oval eye, the external form of the bar being such that it assumes the shape represented by the perspective view, fig. 2, when it is to be cut into transverse sections, indicated by the lines B B, thus forming perfectly shaped axe-blanks, each having a properly formed eye and complete poll.

Having thus briefly described my invention, I claim—

A bar of iron formed substantially in the manner and to the shape herein described, to the end that the same may be divided by cutting transversely into sections, of which each shall constitute an axe-blank as described, as an improved article of manufacture.

JOSIAH W. ELLS.

Witnesses:
    JOHN McKENNA,
    J. B. WHALEY.